United States Patent [19]
Haas et al.

[11] 4,100,333
[45] Jul. 11, 1978

[54] BATTERY STRUCTURE

[75] Inventors: Ronald J. Haas, San Jose; Donald D. Briggs, Mountain View, both of Calif.

[73] Assignee: Ford Aerospace & Communications Corp., Dearborn, Mich.

[21] Appl. No.: 793,907

[22] Filed: May 4, 1977

[51] Int. Cl.² .............................................. H01M 6/42
[52] U.S. Cl. .................................... 429/156; 429/176
[58] Field of Search ........................ 429/156, 163, 176

[56] References Cited

U.S. PATENT DOCUMENTS 2,980,751  4/1961  Tore et al. ...................... 429/156 X

*Primary Examiner*—Charles F. LeFevour
*Attorney, Agent, or Firm*—William E. Johnson; Keith L. Zerschling

[57] ABSTRACT

This specification teaches a battery structure of lightweight construction. Such a battery is particularly useful as the power source for a space satellite. The battery structure includes a plurality of cells. Each cell has a plurality of non-strengthened cell walls which contact other nonstrengthened cell walls when the cells are in an assembled condition. Each cell also has strengthened cell walls which do not contact any other cell walls when the cells are in an assembled condition. Structurally strengthened end plates are located at opposite ends of the assembled cells to provide support for any non-strengthened cell walls of the cells coming in contact therewith. Structure is provided for holding the structurally strengthened end plates and cells in an assembled condition. By strengthening only exposed walls, a lightweight battery construction is achieved.

3 Claims, 7 Drawing Figures

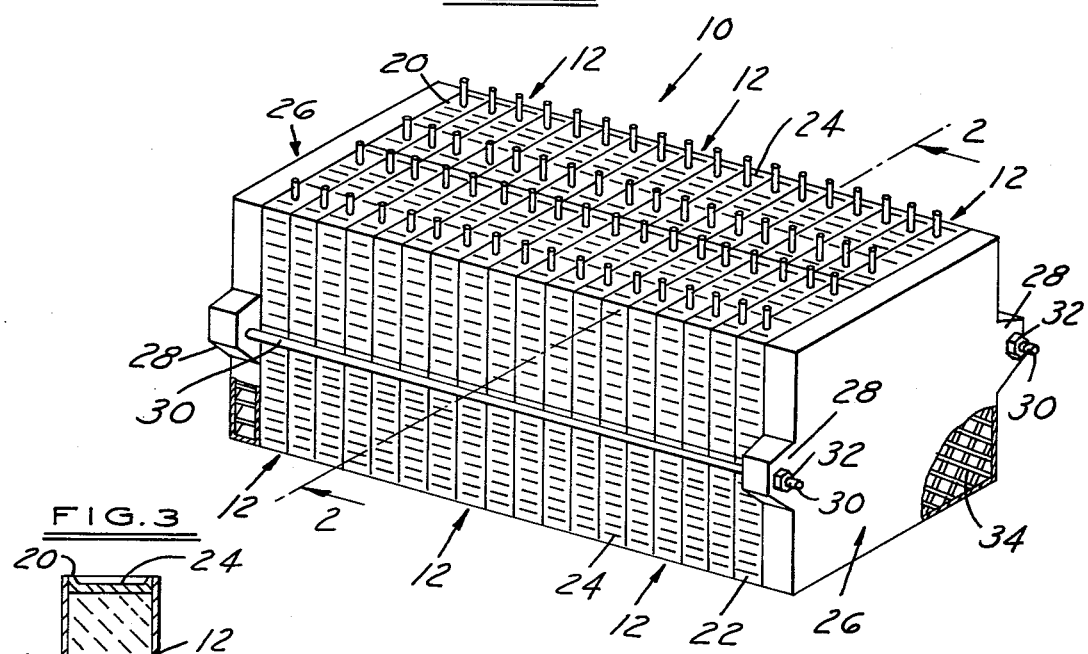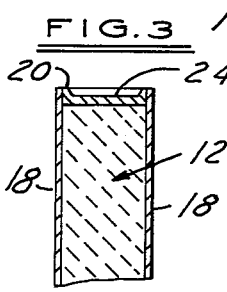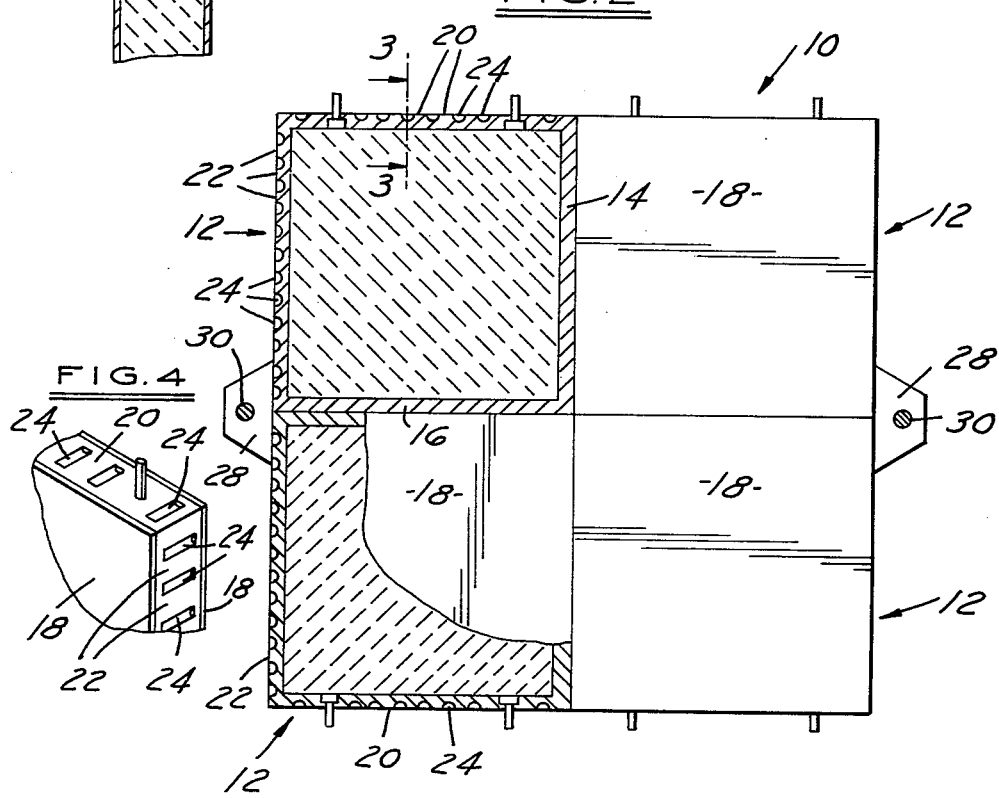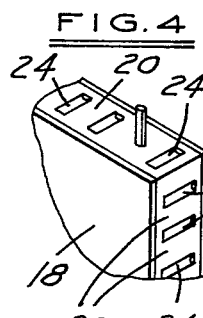

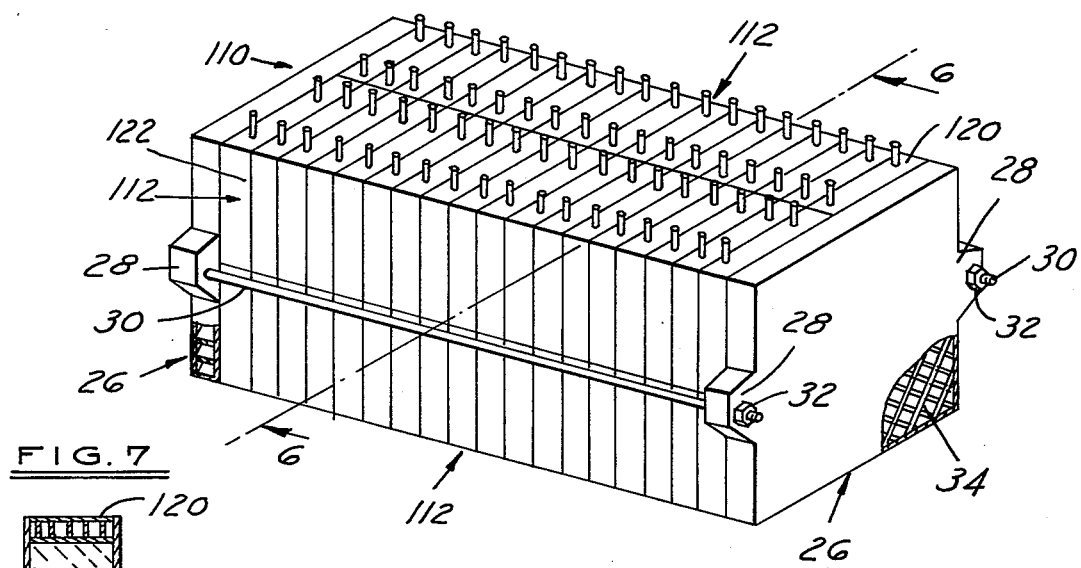
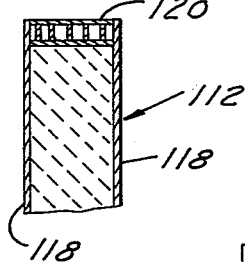
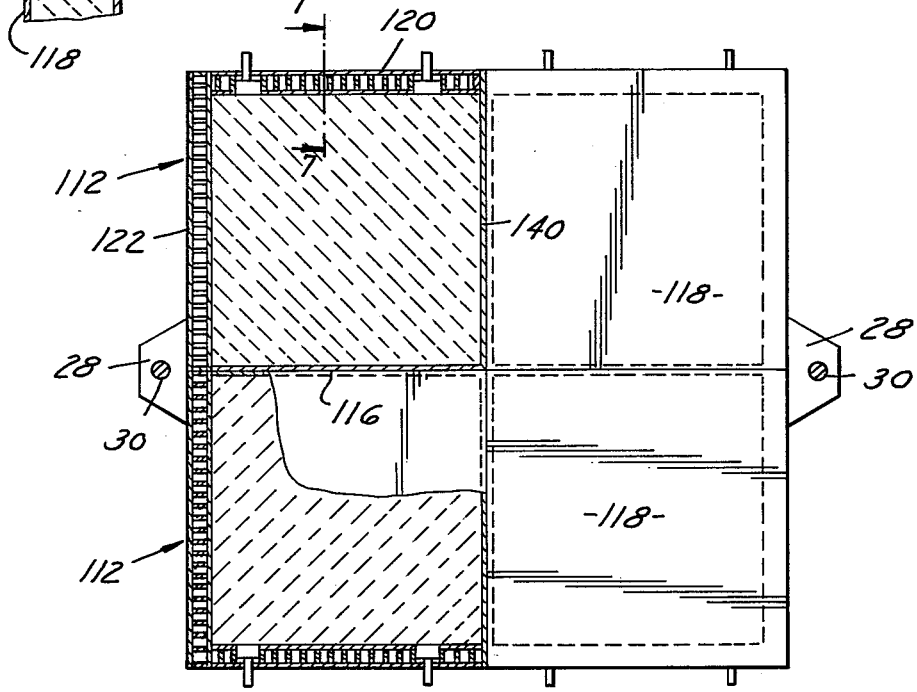

BATTERY STRUCTURE

BACKGROUND OF THE INVENTION

In recent years, the communication industry has used a number of earth orbiting communications satellites for the purpose of transmitting communication signals between various countries. In general, the communication satellites are stabilized in a synchronous orbit at a fixed point above the earth. A signal is beamed from one country to the satellite, is received by the satellite, amplified and rebeamed from the satellite back to an earth station in another country. The types of messages which can be so transmitted include not only telephone conversations but also such things as data communications and television pictures.

In constructing such a communication satellite, it is important to make the components thereof as light in weight as possible. The lighter each component is the more fuel that may be carried in the satellite for the purpose of stabilizing the same. The increase in fuel capacity for stabilization purposes means that the satellite will have a longer useful time in earth orbit as that location in earth orbit is controlled by the stabilizing systems.

One item which is used on such communication satellites is a storage battery. This invention is directed to a storage battery for such use which is of lightweight construction. By reducing the weight of the battery, additional fuel may be carried in the satellite.

It is a principal object of this invention to provide a lightweight battery structure which is suitable for use in communication satellites.

A novelty study conducted on the subject matter of this invention disclosure contained the following cited patents: U.S. Pat. Nos. 2,757,222; 3,061,662; 3,338,007; 3,553,020; 3,623,917; and 3,844,841.

SUMMARY OF THE INVENTION

This invention relates to a battery structure and, more particularly, to a lightweight battery structure which is suitable for use in spacecraft applications.

In accordance with the general teachings of this invention, the lightweight battery structure comprises a plurality of cells. Each cell has a plurality of nonstrengthened cell walls. Such nonstrengthened cell walls contact other nonstrengthened cell walls of other cells when the cells are in an assembled condition. Each cell also has at least one strengthened cell wall. This strengthened cell wall does not contact any other cell wall of any other cell when the cells are in an assembled condition. A pair of structurally strengthened end plates are located at opposite ends of the cells when the cells are in an assembled condition. These end plates provide support for any nonstrengthened cell walls of the cells coming in contact therewith. Holding structure is provided for holding the cells and the structurally strengthened end plates in an assembled condition. In such an assembled condition, the nonstrengthened cell walls are supported by one another or by the structurally strengthened end plates whereas the strengthened cell walls of the cells are exposed and not supported by any contacting cell walls of other cells.

In accordance with the preferred teachings of this invention, the nonstrengthened cell walls may be made from a thin metal sheet. In this case, the strengthened cell walls are made from the same thin metal sheet which has die form channels located therein in order to lend rigidity and greater strength to the walls.

Another form of the invention is embodied in a structure in which the nonstrengthened cell walls are formed from a very thin fiber reinforced composite material of lightweight. In this case, the strengthened walls are formed from a reinforced honeycomb structure which has substantially greater strength than do the nonstrengthened walls.

BRIEF DESCRIPTION OF THE DRAWINGS

FIG. 1 is a view of a battery formed in accordance with one preferred embodiment of this invention.

FIG. 2 is a cross section view in elevation taken along line 2—2 of FIG. 1.

FIG. 3 is a partial cross section view taken along line 3—3 of FIG. 2.

FIG. 4 is a view of one corner of a cell.

FIG. 5 is a view of an alternate form of the structure of this invention.

FIG. 6 is a cross section view in elevation taken along line 6—6 of FIG. 5.

FIG. 7 is a partial cross sectional view taken along line 7—7 of FIG. 6.

DESCRIPTION OF THE PREFERRED EMBODIMENTS

In order to illustrate the principals of this invention, two preferred embodiments of the invention are disclosed herein. The first embodiment is disclosed in FIGS. 1 through 4 in which individual cells of the overall battery are made from metal walls. In the second embodiment disclosed in FIGS. 5 through 7, the cell walls are made from a mixture of metal and fiber reinforced composite structures. These two different embodiments will be discussed in detail hereinbelow.

In FIG. 1, there is seen a battery generally designated by the numeral 10. The battery includes a plurality of cells 12 which in the embodiment shown are formed so that four cells make up one cross section of the battery. In the battery shown there are 18 rows of the four-cell units. In total, therefore, the battery 10 contains 72 individual cells.

The construction for the individual cells is best seen by referring to FIGS. 2 and 3. In this embodiment the individual cells 12 are formed from a plurality of cell walls. With reference to FIG. 2, a back cell wall 14 and a bottom cell wall 16 of an individual cell 12 are formed from a 304L stainless steel or nickel alloy such as 718A Inconel (trademark) sold by International Nickel Company which has a thickness in the range from 0.004 inch to 0.010 inch. Side walls 18 (shown best in FIG. 3) of each cell are formed of the same material. The walls 14, 16 and 18 are nonstrengthened walls. It is readily apparent, however, that these nonstrengthened walls abut similar nonstrengthened walls of other cells either in the same row therewith or in adjacent rows whereby support is obtained for the nonsupported walls. The support obtained is a mutually dependent support with one nonsupported wall supporting that in contact with it in a mutual relationship.

Once again with reference to FIG. 2, an upper wall 20 and an outer side wall 22 of each of the cells 12 has a plurality of die formed strengthening channels 24 therein for the purpose of strengthening these outer walls. These outer walls are also formed of the same material as the previously described walls. These die formed channels have a radius of 75 to 120 mils and are formed by metal sheet drawing process. These die formed channels strengthened the outer wall to prevent bending and deflection damage to the container due to internal cell pressure increases normally encountered during overcharge operation. When the individual cells 12 are in an assembled condition, the strengthened walls are not in contact with cell walls of other cells.

A pair of structurally strengthened end plates generally identified by the numeral 26 are located at opposite ends of the assembled cells 12 as is best seen in FIG. 1. These end plates have a pair of projecting portions 28 through which a through bolt 30 extends to receive suitable nuts 32 thereon. By such means, the end plates hold the plurality of cells 12 in an assembled condition.

Each end plate 26 is formed from a lightweight aluminum structure in which the faces of the members are made from thin aluminum. The internal portion of each end plate is formed from an aluminum honeycomb 34, shown only in FIG. 1, in which the cell spacing is approximately ¼ inch. Each end plate also provides structural support for the nonstrengthened side cell walls which come in contact therewith.

In accordance with the construction of this invention, individual cells 12 have both nonstrengthened cell walls and strengthened cell walls. In the final assembly, the nonstrengthened cell walls contact either other nonstrengthened cell walls to provide support therefor or contact the structurally strengthened end plates to provide support therefor. The structurally strengthened cell walls do not engage any other cell wall and are generally exposed. By providing strengthened walls for only those walls which are nonsupported, the cost of making the battery cell is reduced because it is not necessary to carry out the die forming strengthening operation on the nonsupported walls. Also, the walls can be relatively thin because those which are not supported by other walls are the only walls which are strengthened.

Reference is now made to the battery generally identified by the numeral 110 as shown in FIG. 5. Once again in this construction, a plurality of battery cells generally identified by the numeral 112 are provided. These cells are stacked in a manner similar to the stacking of the cells 12 previously described with the battery 10. In this situation, however, the structure is built slightly different. Reference is made to FIG. 6 wherein a back wall 114 and a bottom wall 116 are shown. These walls are nonstrengthened walls and they are made from a fiber reinforced epoxy composite such as manufactured by Fiberite Corporation of Winoma, Minn. which has a thickness of 0.004 inches. This material is identified by Fiberite as their material HYE 1334. The material could also be an epoxy fiber such as manufactured by DuPont under the name Kevlar (trademark) which has a thickness of 0.004 inches. Another material which is suitable is a fiberglass epoxy manufactured by Hexcell having a thickness of 0.004 inches and identified by Hexcell as their number F161-120. As shown in FIG. 7, the side walls 118 of each cell 112 can also be made of this same relatively thin material.

An upper wall 120 and an outer side wall 122 are made by forming a sandwich of two thin sheets of materials such as identified above between a honeycomb matrix formed of this material. Such material may be bonded together with an epoxy adhesive such as manufactured by American Cynamid and identified by their number FM123. This laminated sandwich provides structural strength in those walls which are not supported by other adjacent walls.

The plurality of individual cells 112 are supported by the use of structurally strengthened end plates 26, 26 as was described before during the description of the battery 10. These structurally strengthened end plates 26 are formed in the same manner as described previously and function in a manner whereby they hold the plurality of cells in an assembled condition. In their assembled conditions, the structurally strengthened walls of the cells are exposed and not engaged by other cell walls whereas the nonstrengthened walls engage other nonstrengthened walls to find support therefor or engage the strengthened end plates to provide strength therefor.

There has been disclosed herein a battery structure which is of lightweight construction. In view of the teachings of this specification, those skilled in the art will be able to make other modifications thereof which fall within the true spirit and scope of this invention. It is intended that all such modifications be included within the scope of the appended claims.

What we claim is:

1. A battery structure which comprises:
a plurality of cells;
each cell having a plurality of nonstrengthened cell walls, such nonstrengthened cell walls contacting other nonstrengthened cell walls of other adjacent cells when said cells are in an assembled condition;
each cell also having strengthened cell walls having a strength greater than said nonstrengthened cell walls, such strengthened cell walls not contacting any cell walls of other cells when said cells are in an assembled condition;
a pair of structurally strengthened end plates located at opposite ends of said cells when said cells are in an assembled condition, said end plates providing support for any nonstrengthened cell walls of said cells coming in contact therewith; and
means for holding said cells and said structurally strengthened end plates in an assembled condition, whereby said nonstrengthened cell walls are supported by one another or by said structurally strengthened end plates and said strengthened cell walls of said cells are exposed and not supported by a contacting cell wall.

2. A battery structure which comprises:
a plurality of cells;
each cell having a plurality of nonstrengthened metal cell walls, such nonstrengthened metal cell walls contacting nonstrengthened metal cell walls of other adjacent cells when said cells are in an assembled condition;
each cell also having die-formed strengthened channel metal cell walls having a strength greater than said nonstrengthened metal cell walls, such die-formed strengthened metal cell walls not contacting any cell walls of other cells when said cells are in an assembled condition;
a pair of structurally strengthened end plates located at opposite ends of said cells when said cells are in an assembled condition, said end plates providing support for any nonstrengthened metal cell walls of said cells coming in contact therewith; and
a pair of structurally strengthened end plates located at opposite ends of said cells when said cells are in an assembled condition, said end plates providing support for any nonstrengthened metal cell walls of said cells coming in contact therewith; and means for holding said cells and said structurally strengthened end plates in an assembled condition whereby said nonstrengthened metal cell walls are supported by one another or by said structurally strengthened end plates, and said die-formed strengthened channel metal walls of said cells are exposed and not supported by a contacting cell wall.

3. A battery structure which comprises:

a plurality of cells;

each cell having a plurality of fiber reinforced composite nonstrengthened cell walls, such fiber reinforced composite cell walls contacting fiber reinforced composite cell walls of other adjacent cells when said cells are in an assembled condition;

each cell also having reinforced honeycomb strengthened cell walls having a strength greater than said fiber reinforced composite nonstrengthened cells walls, such reinforced honeycomb strengthened cell walls not contacting any cell walls of other cells when said cells are in an assembled condition;

a pair of structurally strengthened end plates located at opposite ends of the cells when said cells are in an assembled condition, said end plates providing support for any fiber reinforced composite nonstrengthened cell walls of said cells coming in contact therewith; and means for holding said cells and said structurally strengthened end plates in an assembled condition, whereby said fiber reinforced composite nonstrengthened cell walls are supported by one another or by said structurally strengthened end plates, and said reinforced honeycomb strengthened walls of said cells are exposed and not supported by a contacting cell wall.

* * * * *